United States Patent
Ogawa et al.

(10) Patent No.: US 7,484,815 B2
(45) Date of Patent: Feb. 3, 2009

(54) BRAKE DEVICE OF MOTORCYCLE

(75) Inventors: Sumitaka Ogawa, Saitama (JP); Hideo Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 11/300,334

(22) Filed: Dec. 15, 2005

(65) Prior Publication Data

US 2006/0131954 A1 Jun. 22, 2006

(30) Foreign Application Priority Data

Dec. 16, 2004 (JP) ............................. 2004-365125
Aug. 24, 2005 (JP) ............................. 2005-242056

(51) Int. Cl.
*B60T 8/88* (2006.01)
*G06F 19/00* (2006.01)
*G01C 25/00* (2006.01)

(52) U.S. Cl. ................. 303/122; 303/122.3; 303/122.4; 303/122.5; 303/122.6; 303/122.7; 303/122.8; 303/122.9; 303/137; 303/178; 303/113.4; 701/34; 701/50; 702/116; 702/51; 702/52; 702/53; 702/54; 702/55; 702/138; 702/140; 702/182; 702/183; 702/185

(58) Field of Classification Search ................. 303/122, 303/122.3–122.9, 137, 178, 9.64, 113.4, 303/9.54; 701/34, 50; 702/116, 51–55, 138, 702/140, 182, 183, 185
See application file for complete search history.

(56) References Cited

U.S. PATENT DOCUMENTS

| | | | |
|---|---|---|---|
| 4,753,492 A | * | 6/1988 | Leiber et al. ............. 303/122.1 |
| 6,007,164 A | * | 12/1999 | Sakai et al. ............ 303/122.12 |
| 6,086,166 A | * | 7/2000 | Fukasawa ................... 303/152 |
| 6,119,059 A | * | 9/2000 | Tai et al. ...................... 701/29 |
| 6,267,454 B1 | | 7/2001 | Takahashi |
| 6,382,737 B1 | * | 5/2002 | Isono et al. .............. 303/114.1 |
| 6,425,644 B2 | * | 7/2002 | Kawahata et al. ........... 303/122 |
| 6,446,490 B1 | * | 9/2002 | Lohner et al. .................. 73/39 |
| 6,572,200 B2 | * | 6/2003 | Soga et al. ..................... 303/3 |

(Continued)

FOREIGN PATENT DOCUMENTS

DE     101 10 060 A1     9/2001

(Continued)

*Primary Examiner*—Robert A Siconolfi
*Assistant Examiner*—Mahbubur Rashid
(74) *Attorney, Agent, or Firm*—Birch, Stewart, Kolasch & Birch, LLP (57) ABSTRACT

To enable a trouble diagnosis of braking-input-side pressure sensors even in a state where a braking input side and a braking output side are interrupted from each other. In a brake device of a vehicle in which a braking input side which generates a liquid pressure by manipulating a brake manipulation portion and a braking output side which supplies the liquid pressure to a brake caliper are made to be communicated with each other or being interrupted from each other by way of a first electromagnetic open/close valve, and the brake device includes a hydraulic modulator which adjusts the liquid pressure of the braking output side by operating an electrically-operated motor, the brake device includes a first pressure sensor and a second pressure sensor for detecting the liquid pressure of the braking input side, and a trouble diagnosis of the pressure sensors is performed in response to detection values of the pressure sensors.

6 Claims, 6 Drawing Sheets

U.S. PATENT DOCUMENTS

| | | | |
|---|---|---|---|
| 6,672,687 B2 * | 1/2004 | Nishio | 303/122.09 |
| 6,824,227 B1 * | 11/2004 | Kiesewetter et al. | 303/155 |
| 2002/0000752 A1 | 1/2002 | Kusano et al. | |
| 2002/0125764 A1 | 9/2002 | Sakamoto | |
| 2002/0180267 A1 * | 12/2002 | Hara et al. | 303/187 |
| 2005/0253452 A1 * | 11/2005 | Weeber et al. | 303/122 |

FOREIGN PATENT DOCUMENTS

| | | |
|---|---|---|
| DE | 103 33 323 A1 | 1/2004 |
| JP | 2001-310717 A | 11/2001 |

\* cited by examiner

BRAKE DEVICE OF MOTORCYCLE

CROSS-REFERENCE TO RELATED APPLICATIONS

This nonprovisional application claims priority under 35 U.S.C. § 119(a) on Patent Application Nos. 2004-365125 and 2005-242056, filed in Japan on Dec. 16, 2004 and Aug. 24, 2005, respectively. The entirety of each of the above-identified applications is incorporated herein by reference.

BACKGROUND OF THE INVENTION

1. Field of the Invention

The present invention relates to a brake device for a vehicle. In particular, the present invention relates to a brake device for a motorcycle.

2. Description of Background Art

A hydraulic brake device which is popularly used in a vehicle such as a motorcycle includes a braking input side which allows a driver to generate a liquid pressure by manipulating a brake manipulation portion and a braking output side which supplies the liquid pressure to a wheel control mechanism. The braking input side and the braking output side communicate with each other or are interrupted from communication with each other by way of an electromagnetic valve.

As an example, there has been known a so-called bi-wire-type brake device in which a manipulation variable of the brake manipulation portion is electrically detected. A liquid pressure generating device is controlled in response to a detection value thus generating a liquid pressure. In addition, a vehicle control mechanism is manipulated (see JP-A-2001-310717, for example).

In such a bi-wire-type brake device, for example, a master cylinder which is interlockingly operated with a brake lever (brake manipulation portion), and a brake caliper (wheel braking mechanism) which imparts a braking force to the wheel by a hydraulic manipulation are connected with each other by a brake passage which is provided with a normally-open electromagnetic open/close valve. A hydraulic modulator, which supplies the liquid pressure generated by an electrically-operated actuator to the brake caliper, is connected to a brake caliper side of the brake passage from the above-mentioned electromagnetic open/close valve.

In such a brake device, at the time of performing the braking operation, the brake caliper and the hydraulic modulator are separated from the master cylinder by closing the above-mentioned electromagnetic open/close valve thus controlling the electrically-operated actuator in response to the liquid pressure of the braking input side so as to allow the hydraulic modulator to generate a liquid pressure of the braking output side. Therefore, the generated liquid pressure is supplied to the brake caliper thus performing the braking operation. In this case, to enhance the responsiveness or to stabilize the braking performance, it may be possible to close the brake passage by closing the above-mentioned electromagnetic open/close valve when an ignition switch is turned ON or a vehicle speed reaches a given vehicle speed thus ensuring a standby state from a non-braking time.

In this manner, in the brake device which controls the electrically-operated actuator in response to the liquid pressure of the braking input side so as to control the liquid pressure of the braking output side (that is, the supply pressure to the brake caliper), a pressure sensor for detecting the liquid pressure of the braking input side and a pressure sensor for detecting the liquid pressure of the braking output side become necessary. Therefore, conventionally, one pressure sensor is respectively provided to the braking input side and the braking output side.

However, with respect to the conventional brake device, which is provided with one pressure sensor at the braking input side and one pressure sensor at the braking output side, there exists a following difficulty in performing a trouble diagnosis or troubleshooting the pressure sensor at the braking input side.

With respect to the pressure sensor at the braking output side, the trouble diagnosis can be performed by comparing an output value of the pressure sensor at the braking output side and an operation state of the electrically-operated actuator (for example, a current value of a drive motor, a detection value of a crank angle sensor or the like).

On the other hand, with respect to the pressure sensor at the braking input side, in a state that the braking input side and the braking output side are in communication with each other, it is possible to perform the trouble diagnosis by comparing the output value of the pressure sensor at the braking input side and the output value of the pressure sensor at the braking output side. However, in a state that the braking input side and the braking output side are interrupted from each other, there exists no comparison object and hence, the trouble diagnosis of the pressure sensor at the braking input side using the above-mentioned method is difficult.

SUMMARY OF THE INVENTION

Accordingly, the present invention provides a brake device for a vehicle which can easily perform a trouble diagnosis with respect to a pressure detection mechanism at a braking input side even in a state where the control input side and a control output side are interrupted from each other.

To overcome the above-mentioned problem, a first aspect of the present invention is directed to a brake device for a vehicle in which a braking input side which generates a liquid pressure by manipulating a brake manipulation portion (for example, a brake manipulation portion 2 in an embodiment described later) of wheels and a braking output side which supplies the liquid pressure to a wheel braking mechanism (for example, a brake caliper 4 in the embodiment described later) of the wheels are made to be in communication with each other or interrupted from each other by way of an open/close device (for example, a first electromagnetic open/close valve V1 in the embodiment described later). The brake device includes a hydraulic modulator (for example, a hydraulic modulator 6 in the embodiment described later) which adjusts the liquid pressure of the braking output side by operating an electrically-operated actuator (for example, an electrically-operated motor 23 in the embodiment described later), wherein the brake device includes a plurality of pressure detection mechanisms (for example, a first pressure sensor 28A, a second pressure sensor 28B in the embodiment described later) for detecting the liquid pressure of the braking input side. A trouble diagnosis of the pressure detection mechanism is performed in response to detection values of the pressure detection mechanism.

Due to such a constitution, even when the braking input side and the braking output side are interrupted from each other by the above-mentioned open/close device, it is possible to easily perform the trouble diagnosis of the pressure detection mechanism at the braking input side based on the detection values of the respective pressure detection mechanism at the braking input side.

According to a second aspect of the present invention, all of the above-mentioned plurality of pressure detection mechanisms have the same detection range.

Due to such a constitution, it is possible to perform the trouble diagnosis of the pressure detection mechanism at the braking input side based on whether the detection values of the respective pressure detection mechanisms at the braking input side substantially agree with each other or not.

According to a third aspect of the present invention, the plurality of pressure detection mechanisms differ from each other with respect to at least a portion of the detection range.

Due to such a constitution, it is possible to enhance the accuracy of the trouble diagnosis.

According to a fourth aspect of the present invention, detection values of the plurality of pressure detection mechanisms are compared and a trouble diagnosis of the pressure detection mechanism is performed based on a comparison value.

Due to such a constitution, it is possible to perform the trouble diagnosis easily and accurately. Here, the comparison value may be a difference or a ratio (quotient).

According to a fifth aspect of the present invention, the trouble diagnosis of the pressure detection mechanism is performed based on whether the detection value of one pressure detection mechanism out of the plurality of pressure detection mechanisms falls within the detection range of other pressure detection mechanisms or not.

Due to such a constitution, it is possible to enhance the accuracy of the trouble diagnosis.

According to a sixth aspect of the present invention, when the detection value of one pressure detection mechanism out of the plurality of pressure detection mechanisms is out of the detection range of other pressure detection mechanisms, the trouble diagnosis of the pressure detection mechanism is performed based on whether a continuation time of a state where the detection value of one pressure detection mechanism is out of the detection range exceeds a set time which is preliminarily set or not.

Due to such a constitution, when the continuation time of a state that the detection value of the pressure detection mechanism is out of the detection range exceeds the set time, which is preliminarily set, it is possible to determine that the pressure detection mechanism is in trouble.

According to a seventh aspect of the present invention, when the continuation time exceeds the above-mentioned set time, the trouble diagnosis of the pressure detection mechanism is performed based on whether a vehicle speed exceeds a given vehicle speed which is preliminarily set or not.

Due to such a constitution, when the vehicle speed exceeds the preset given vehicle speed, it is possible to determine that the pressure detection mechanism is in trouble.

According to the first aspect of the present invention, even when the braking input side and the braking output side are interrupted from each other, it is possible to easily perform the trouble diagnosis of the pressure detection mechanism at the braking input side based on the detection values of the respective pressure detection mechanism at the braking input side.

According to the second aspect of the present invention, it is possible to perform the trouble diagnosis of the pressure detection mechanism at the braking input side based on whether the detection values of the respective pressure detection mechanism at the braking input side substantially agree to each other or not.

According to the third aspect of the present invention, it is possible to enhance the accuracy of trouble diagnosis.

According to the fourth aspect of the present invention, it is possible to perform the trouble diagnosis easily and accurately.

According to the fifth aspect of the present invention, it is possible to enhance the accuracy of trouble diagnosis.

According to the sixth aspect of the present invention, when the continuation time of the state where the detection value of one pressure detection mechanism is out of the detection range exceeds the set time which is preliminarily set, it is possible to determine that the pressure detection mechanism is in trouble and hence, the accuracy of the trouble diagnosis is enhanced.

According to the seventh aspect of the present invention, when the vehicle speed exceeds the preset given vehicle speed, it is possible to determine that the pressure detection mechanism is in trouble and hence, the accuracy of trouble diagnosis is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
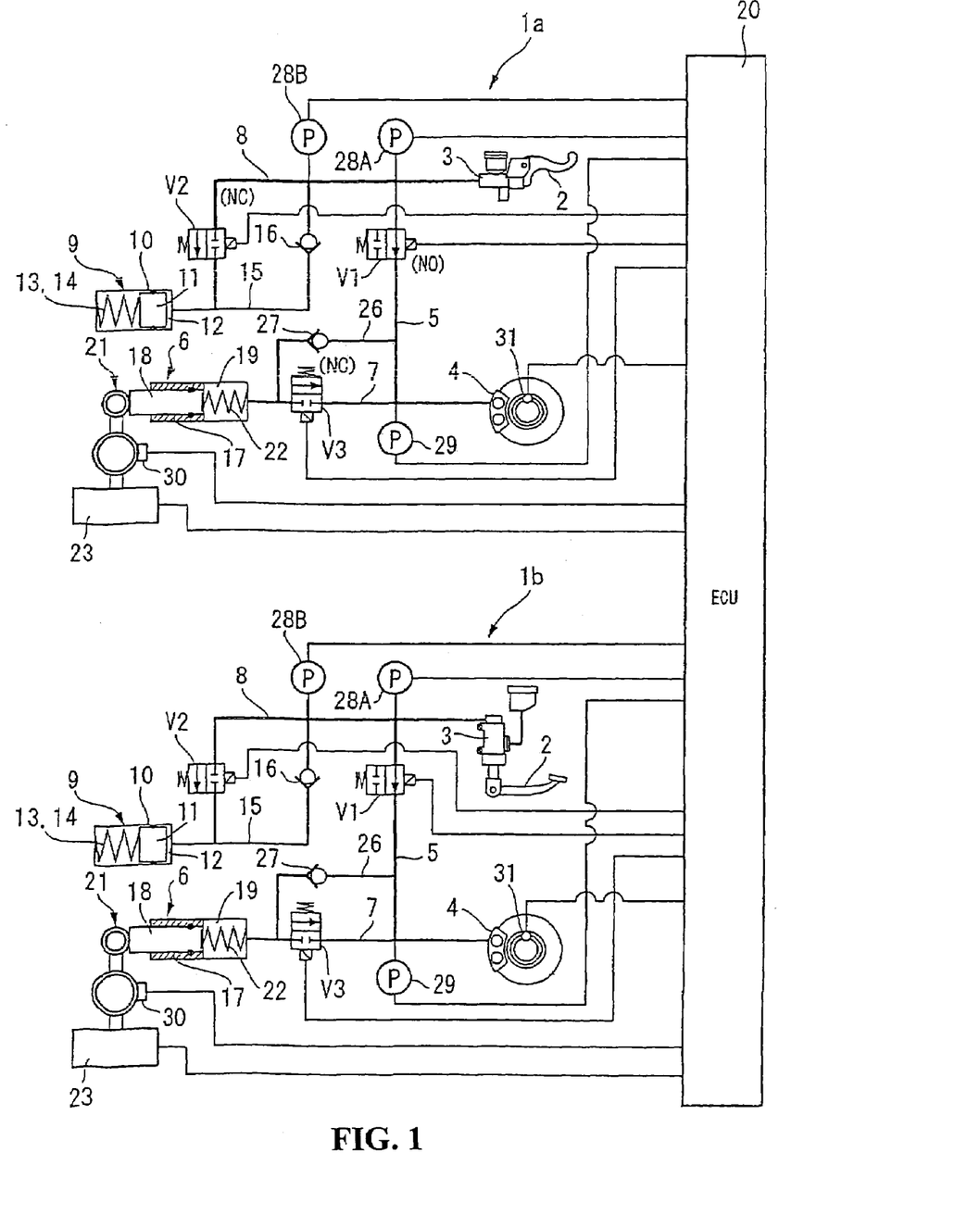
FIG. 1 is a hydraulic circuit diagram of a brake device of a vehicle of one embodiment according to the present invention.

Embodiments of the present invention will now be explained in conjunction with attached drawings. In the following description, a brake device for a vehicle is explained in the embodiments as being applied to a motorcycle, which constitutes a vehicle. However, it should be understood that the present embodiments could be applied to other vehicles as well. FIG. 1 is a hydraulic circuit diagram of a brake device for a vehicle according to a first embodiment of the present invention. As shown in the drawing, the brake device of this embodiment includes linking a front-wheel-side brake circuit 1a and a rear-wheel-side brake circuit 1b, which are provided independent from each other using a controller (ECU) 20.

A braking operation in the front-wheel-side brake circuit 1a is performed by a brake lever, which constitutes a brake manipulation portion 2, while the braking operation in the rear-wheel-side brake circuit 1b is performed by a brake pedal, which constitutes a brake manipulation portion 2. However, the front-wheel-side brake circuit 1a and the rear-wheel-side brake circuit 1b are substantially equal with respect to the constructions except for the above-mentioned construction. Therefore, only the front-wheel-side brake circuit 1a will be explained in detail. With respect to the rear-wheel-side brake circuit 1b, parts identical with parts of the front-wheel-side brake circuit 1a are given same symbols and the repeated explanation is omitted.

In the braking device, both of a front wheel and a rear wheel adopt a by-wire system, wherein a manipulated variable (in this embodiment, liquid pressure) of the brake manipulation portion such as the brake lever is electrically detected and a braking force is generated by the liquid pressure which is produced by a hydraulic modulator in response to a detection value.

Furthermore, the braking device adopts a brake system which allows front and rear wheel braking mechanisms to perform a braking operation in an interlocking manner with each other by performing the braking manipulation of one side of the front and rear wheels (CBS: COMBINED BRAKE SYSTEM, hereinafter referred to as "CBS").

To be more specific, in the braking circuit on the side at which the braking manipulation portion 2 is manipulated, the liquid pressure which is applied by the hydraulic modulator based on the liquid pressure of the master cylinder acts on a brake caliper on the side at which the braking manipulation portion 2 is manipulated by the by-wire system. Furthermore, in the braking circuit at which the braking manipulation portion 2 is manipulated later based on the master cylinder pressure of the braking circuit on the side at which the braking manipulation portion 2 is manipulated, the liquid pressure which is applied by the hydraulic modulator on the brake caliper by the by-wire system.

Furthermore, this braking device adopts a braking system, which generates a proper braking force even when an improper braking manipulation is performed (ABS: ANTI LOCK BRAKE SYSTEM, hereinafter referred to as "ABS").

Each braking circuit 1a, 1b is constituted by connecting the master cylinder 3, which is interlockingly operated with the braking manipulation portion 2 and the braking caliper 4 which corresponds to the master cylinder 3 by way of a main braking passage 5. To a middle portion of the above-mentioned main braking passage 5, the hydraulic modulator 6 described later is connected by merging by way of a supply/discharge passage 7.

A normally-open (NO) first electromagnetic open/close valve V1 which allows the communication and the interruption between the master cylinder 3 and the braking caliper 4 is interposed and, at the same time, a branch passage 8 is connected to a portion of the main braking passage 5 on the master cylinder 3 side from the connecting portion merged with the supply/discharge passage 7. In this embodiment, in each braking circuit 1a, 1b, using the first electromagnetic open/close valve V1 as a boundary, the master cylinder 3 side is defined as a braking input side and the braking caliper 4 side is defined as a braking output side. A fluid loss simulator 9, which applies a pseudo hydraulic reaction force corresponding to a manipulation variable of the braking manipulation portion 2 to the master cylinder 3 when the above-mentioned first electromagnetic open/close valve V1 closes the main braking passage 5, is connected by way of a normally-closed (NC) second electromagnetic open/close valve V2 to the branch passage 8. The second electromagnetic open/close valve V2 is provided for allowing the master cylinder 3 side and the fluid loss simulator 9 to communicate with each other by opening the branch passage 8 when the reaction force is applied.

The above-mentioned fluid loss simulator 9 is constituted such that a piston 11 is reciprocally accommodated in a cylinder 10. A fluid chamber 12, which receives a working liquid flowing from the master cylinder 3 side, is formed between the cylinder 10 and the piston 11. On a back portion side of the piston 11, a coil spring 13 and a resin spring 14 which differ in characteristic from each other are arranged in series. With the use of these two coil springs consisting of the coil spring 13 and the resin spring 14, it is possible to impart a reaction force to the piston 11 (the brake manipulation portion 2), wherein the reaction force has a characteristic where the rise of the reaction force is gentle initially and becomes sharp at a stroke end.

Furthermore, a bypass passage 15 is provided to the branch passage 8 in a state where the bypass passage 15 bypasses a second electromagnetic open/close valve V2. A check valve 16, which allows the flow of the working liquid in the direction toward the master cylinder 3 from the fluid loss simulator 9 side, is provided to the bypass passage 15.

The above-mentioned hydraulic modulator 6 includes a cam mechanism 21 which pushes a piston 18 disposed in the inside of a cylinder 17 in the direction of a hydraulic chamber 19 which is formed between the cylinder 17 and the piston 18. A return spring 22 constantly pushes the piston 18 to a cam mechanism 21 side. An electrically-operated motor 23 operates the cam mechanism 21. The hydraulic chamber 19 is communicably connected with the supply/discharge passage 7. The hydraulic modulator 6 pushes the piston 18 by the electrically-operated motor 23 by way of the cam mechanism 21 using an initial position of the cylinder 17 as a reference or retracts the piston 18 using the return spring 22 thus increasing or decreasing the pressure in the inside of the hydraulic chamber 19. Hence, it is possible to increase or decrease a braking force of the brake caliper 4.

In the above-mentioned electrically-operated motor 23, by adjusting a current value which is determined based on an input duty ratio (ON time/(ON time+OFF time)) using a PWM control, a position of the piston 18 which is determined based on a rotational position of the above-mentioned cam mechanism 21 can be electrically, accurately and easily adjusted. Thus, the pressure in the inside of the hydraulic chamber 19 is adjusted.

In the cam mechanism 21, a lifter 25 whose stroke is limited by a stopper (not shown in the drawing) is reciprocally arranged by way of a backup spring 24. The piston 18 is constantly pushed by the lifter 25 in the direction to reduce the hydraulic chamber 19. Accordingly, when the electrically-operated motor 23 assumes a non-energized state, the lifter 25 is pushed by the backup spring 24 and is stopped by the stopper. Hence, the piston 18 is returned to an initial position. Due to such a construction, the braking device of the vehicle can perform a CBS control in which the CBS control actively supplies the working liquid to the main brake passage 5 (brake caliper 4) and an ABS control which reciprocates the piston 18 frontwardly and backwardly so as to achieve the pressure reduction, the pressure holding and the next pressure increase of the hydraulic chamber 19.

A normally-closed (NC) third electromagnetic open/close valve V3 is interposed in the above-mentioned supply-discharge passage 7. A bypass passage 26 is provided to the above-mentioned supply/discharge passage 7 in a state where the bypass passage 26 bypasses the third electromagnetic open/close valve V3. A check valve 27, which allows the flow of a working liquid in the direction toward the brake caliper 4 from the hydraulic modulator 6 side, is provided to the bypass passage 26.

In the front-wheel-side brake circuit 1a and the rear-wheel-side brake circuit 1b, in a state where the first electromagnetic open/close valve V1 is sandwiched between the braking input side and the braking output side, a first pressure sensor 28A and a second pressure sensor 28B are provided to the braking input side which constitutes the master cylinder 3 side, while a pressure sensor 29 is provided to the braking output side which constitutes the brake caliper 4 side. The first pressure sensor 28A and the second pressure sensor 28B at the braking input side are provided for detecting a manipulation variable of the brake manipulation portion 2, while the pressure sensor 29 at the braking output side is provided for detecting a liquid pressure of the brake caliper 4 necessary for performing a feedback control of the electrically-operated motor 23.

In FIG. 4, hatched portions indicate detection ranges of the respective pressure sensors 28A, 28B, wherein the first pressure sensor 28A and the second pressure sensor 28B at the braking input side differ in the detection range. In this embodiment, although the first pressure sensor 28A and the second pressure sensor 28B are equal with respect to a lower limit of the detection range, an upper limit of the detection range of the second pressure sensor 28B is larger than an upper limit of the detection range of the first pressure sensor 28A. Furthermore, in this embodiment, in the selective use of the first pressure sensor 28A and the second pressure sensor 28B, when the detection value is smaller than a preset threshold value, the detection value of the first pressure sensor 28A is used and, while when the detection value is equal to or more than the above-mentioned threshold value, the detection value of the second pressure sensor 28B is used.

According to this embodiment, by providing two pressure sensors consisting of the first pressure sensor 28A and the second pressure sensor 28B to the braking input side, the liquid pressure of the master cylinder 3 having a wide dynamic range can be detected with high accuracy from an extremely low liquid pressure to a high liquid pressure. Therefore, it is possible to control a braking force of the wheel smoothly immediately after starting the brake manipulation based on the detected result, whereby it is possible to enhance the brake feeling.

Furthermore, on a cam shaft (not shown in the drawing) of the above-mentioned cam mechanism 21, an angular sensor 30 for feeding back angular information is mounted, while a wheel speed sensor 31, which detects a wheel speed, is mounted on the above-mentioned brake caliper 4.

The controller 20 performs an open/close control of the above-mentioned first electromagnetic open/close valve V1, second electromagnetic open/close valve V2, and third electromagnetic open/close valve V3 based on detection signals of the first pressure sensor 28A and the second pressure sensor 28B at the braking input side, the detection signal of the pressure sensor 29 at the braking output side, a detection signal of the angular sensor 30 and a detection signal of the wheel speed sensor 31. At the same time, the controller 20 performs a drive control of the electrically-operated motor 23.

To be more specific, when the vehicle is stopped, (vehicle speed=0) as shown in FIG. 1, with respect to the front-wheel-side brake circuit 1a and the rear-wheel-side brake circuit 1b, the first electromagnetic open/close valve V1 assumes an open-operation state, the second electromagnetic open/close valve V2 assumes a close-operation state, and the third electromagnetic open/close valve V3 assumes a close-operation state. Accordingly, the respective electromagnetic open/close valves V1, V2, V3 require no electricity.

Figure 2:
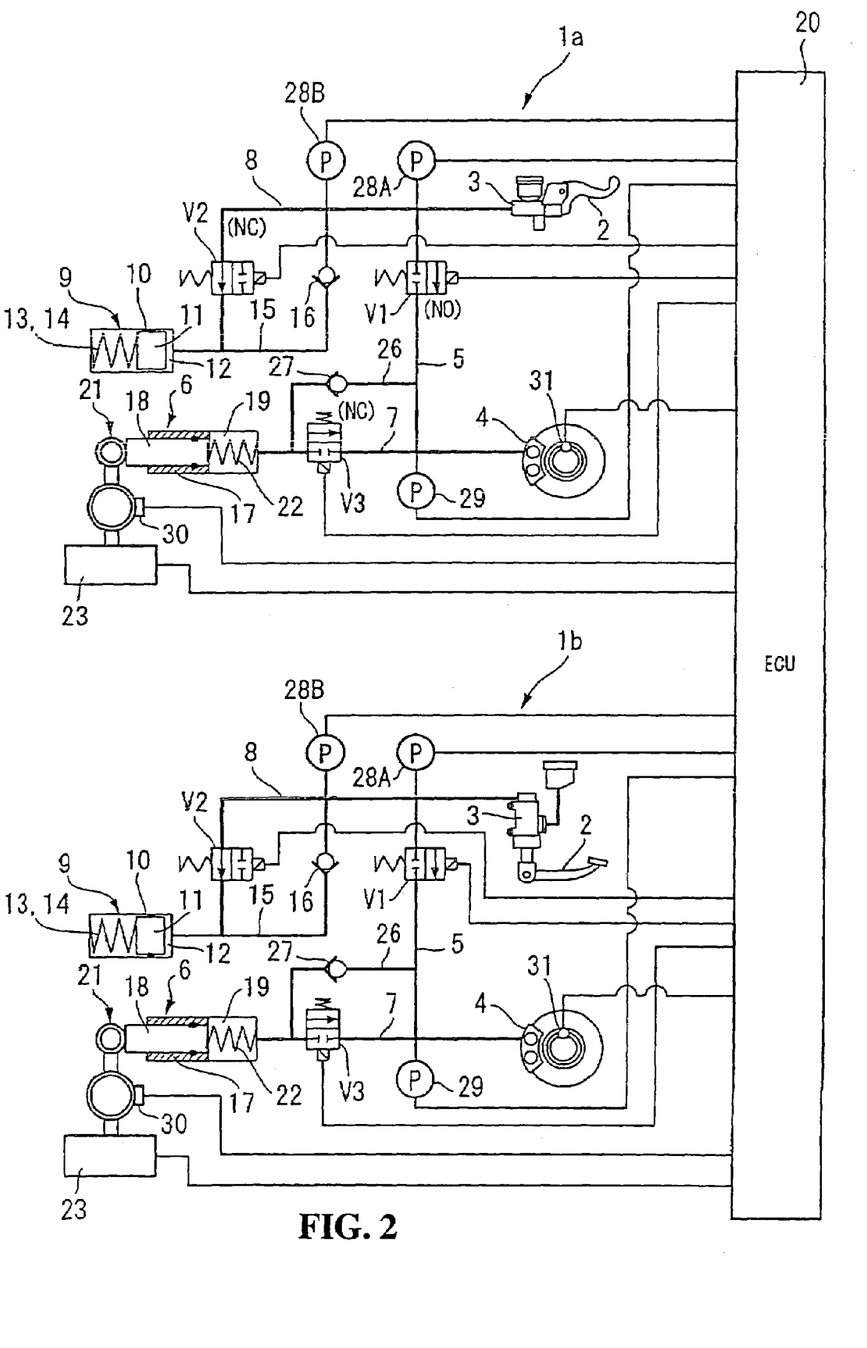
FIG. 2 is a hydraulic circuit diagram of the brake device of the embodiment in a standby state.

When the vehicle starts traveling from this state, the speeds of the front and rear wheels are inputted to the controller 20 from the wheel speed sensors 31, wherein the higher wheel speed out of the wheel speeds of the front and rear wheels is set as an estimated vehicle speed vr of the vehicle. When the arrival of the estimated vehicle speed vr to a given vehicle speed (for example, several km/hr) is detected, as shown in FIG. 2, in the front-wheel-side brake circuit 1a and the rear-wheel-side brake circuit 1b, an electric current is made to flow into the first electromagnetic open-close valve V1 and the second electromagnetic open/close valve V2 thus realizing a standby state in which the first electromagnetic open/close valve V1 assumes a closed state and the second electromagnetic open/close valve V2 assumes an open state. Accordingly, due to the closing operation of the first electromagnetic open/close valve V1, the main brake passage 5 is interrupted and, at the same time, due to the opening operation of the second electromagnetic open/close valve V2, the branch passage 8 and the main brake passage 5 allow the master cylinder 3 and the fluid loss simulator 9 to be in communication with each other. At this point is time, the third electromagnetic open/close valve V3 maintains a non-electrically-contacted state. Therefore, the third electromagnetic open/close valve V3 is closed. This standby state is maintained until a braking signal is inputted to the controller 20 (that is, until a braking input is generated).

Figure 3:
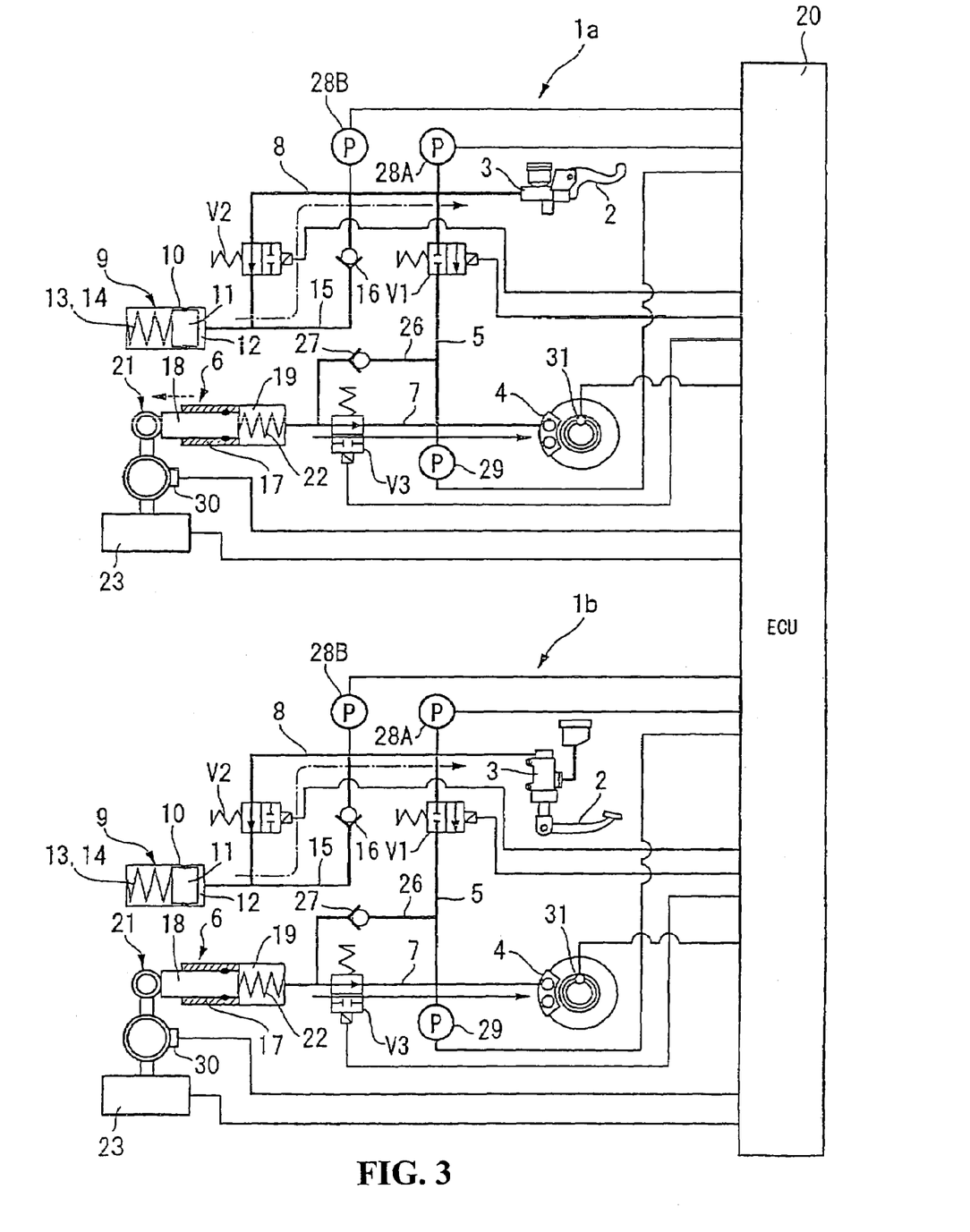
FIG. 3 is a hydraulic circuit diagram of the brake device of the embodiment in a braking operation state.

Then, during the traveling of the vehicle, when a rider manipulates the brake lever which constitutes the front-wheel-side brake manipulation portion 2 (that is, when the braking input to the controller 20 is generated), information on the brake manipulation variable and the like are inputted to the controller 20 through the braking-input-side pressure sensors 28A, 28B. Therefore, the controller 20, as shown in FIG. 3, allows an electric current to flow into the third electromagnetic open/close valve V3 so as to perform the open operation of the third electromagnetic open/close valve V3 whereby the hydraulic modulator 6 and the brake caliper 4 are in communication with each other through the supply-discharge passage 7 and the main brake passage 5.

On the other hand, also in the rear-wheel-side brake circuit 1b, the controller 20 allows an electric current to simultaneously flow into the third electromagnetic open/close valve V3 so as to perform the open operation of the third electromagnetic open/close valve V3 whereby the hydraulic modulator 6 and the brake caliper 4 are made to be in communication with each other through the supply-discharge passage 7 and the main brake passage 5.

Accordingly, the rider can feel the brake manipulation feeling at the front and rear wheel sides which is reproduced in a pseudo manner by the fluid loss simulators 9 of the front-wheel-side and rear-wheel-side brake circuits 1a, 1b (see a chained arrow in FIG. 3) and, at the same time, the liquid pressure fluctuation attributed to the operation of the hydraulic modulator 6 is not transmitted to the rider side since the first electromagnetic open/close valve V1 is performing the closing operation. Furthermore, at this point in time, in parallel to such an operation, the electrically-operated motors 23 of both hydraulic modulators 6 are controlled in response to the driving condition of the vehicle and the brake manipulation (detection values of the braking-input-side pressure sensors 28A, 28B or the like). Therefore, the piston 18 is pushed by the cam mechanism 21 thus pressurizing the working liquid in the hydraulic chamber 19. Accordingly, the liquid pressure corresponding to the control of the electrically-operated motors 23 is supplied to the brake calipers 4 through the main brake passages 5 (see a solid-line arrow in FIG. 3).

In this manner, when the vehicle arrives at a given vehicle speed, the first electromagnetic open/close valve V1 is closed and the second electromagnetic open/close valve V2 is opened thus bringing the brake circuit 1a into a standby state. Therefore, when the braking operation is not performed, it is possible to maintain the master cylinder 3 in a state where the master cylinder 3 is separated or terminated from the hydraulic modulator 6 and the brake caliper 4. As a result, a manipulation stroke of the brake manipulation portion 2 at the time of performing the braking operation becomes stable and hence, the braking feeling is enhanced and, at the same time, it is possible to immediately generate the liquid pressure by the hydraulic modulator 6 when the braking input is generated thus obtaining the stable braking performance.

Furthermore, the above-mentioned controller 20, out of the wheel speeds which are detected by the front-wheel-side wheel speed sensor 31 and the rear-wheel-side wheel speed sensor 31, sets the higher wheel speed as the estimated vehicle speed vr of the vehicle. Furthermore, the controller 20 calculates a front-wheel slip ratio or a rear-wheel slip ratio based on the difference between the estimated vehicle speed vr and the wheel speed of the front wheel or the rear wheel. When the front-wheel slip ratio or the rear-wheel slip ratio exceeds a threshold value of a preset slip ratio (for example, the front wheel in FIG. 3), it is determined that a slip is generated on the wheel and an operation of the ABS control which reduces the liquid pressure of the hydraulic modulator 6 is started. That is, the controller 20 controls the electrically-operated motor 23 thus retracting the piston 18 (indicated by a broken-line arrow in FIG. 3) so as to lower the braking pressure of the brake caliper 4 thus ensuring the proper braking force.

At this point in time, the first electromagnetic open/close valve V1 is closed and hence, the communication between the master cylinder 3 and the hydraulic modulator 6 is interrupted whereby there is no possibility that the pressure change of the ABS control is transmitted to the brake manipulation portion 2 manipulated by the rider.

An explanation has been made with respect to the case where the vehicle is stopped without the operation of the ABS although the brake manipulation portion 2 is manipulated heretofore. However, it is possible to perform the control in the substantially same manner with respect to a case in which operating the ABS stops the vehicle. That is, when the ABS is operated, the ABS performs the reduction of liquid pressure, the maintenance of the liquid pressure and the re-boosting of the liquid pressure of the hydraulic chamber 19. Therefore, it is impossible to specify the magnitude relationship between the above-mentioned master-cylinder-3-side pressure and the brake-calyper-4-side pressure based on points in time when the vehicle is stopped. Accordingly, the ABS includes the normal-reverse-driving of the above-mentioned electrically-operated motor 23 and performs a PWM control of the normal-reverse-driving so as to adjust a current value which is determined by an input duty ratio whereby irrespective of the case in which the liquid pressure is adjusted to the pressure increasing side or the liquid pressure is adjusted to the pressure reducing side, it is possible to electrically accurately and easily and freely adjust the position of the piston 18 determined by a rotational position of the above-mentioned cam mechanism 21.

In this manner, with respect to the brake device of the vehicle, in the respective brake circuits 1a, 1b, the first electromagnetic open/close valve V1 assumes the open state until the vehicle speed arrives at the given vehicle speed and hence, the braking input side and the braking output side are communicated with each other through the main brake passage 5. However, when the vehicle speed becomes equal to or more than the given vehicles speed, the first electromagnetic open/close valve V1 assumes the closed state and hence, the main brake passage 5 is interrupted whereby the braking input side and the braking output side are separated from each other. Accordingly, in case where only one braking-input-side pressure sensor is provided as in the case of the background art, when the braking input side and the braking output side are separated from each other, there is no comparison object and hence, a trouble diagnosis is difficult with respect to the braking-input-side pressure sensor. However, the brake device of this embodiment includes two braking-input-side pressure sensors and hence, even when the braking input side and the braking output side are separated from each other, it is possible to easily perform the trouble diagnosis of the braking-input-side first pressure sensor 28A and second pressure sensor 28B.

Hereinafter, the trouble diagnosis processing of the braking-input-side pressure sensors (first pressure sensor 28A, second pressure sensor 28B) will be explained in accordance with a flow chart shown in FIG. 5.

Figure 5:
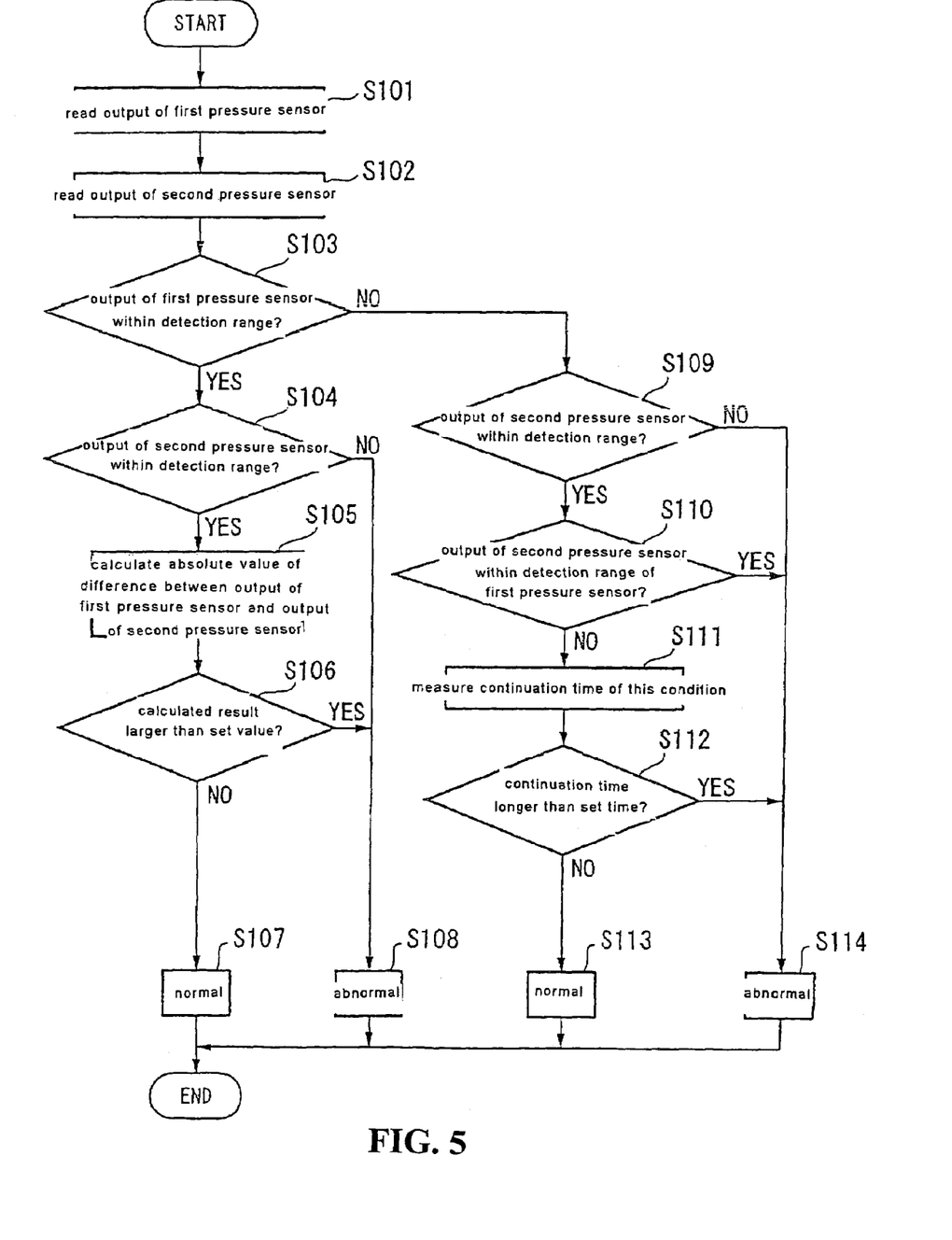
FIG. 5 is a flowchart showing trouble diagnosis processing of a braking-input-side pressure sensor in the above-mentioned embodiment.

A trouble diagnosis processing routine shown in the flow chart of FIG. 5 is repeatedly executed by the controller 20.

First of all, the detection value (hereinafter referred to as output) P1 of the first pressure sensor 28A is read in step S101, and the detection value (hereinafter referred to as output) P2 of the second pressure sensor 28B is read in step S102.

Next, the processing advances to step S103 in which it is determined whether the output P1 of the first pressure sensor 28A is within a detection range of the first pressure sensor 28A or not. Here, the state that the output P1 of the first pressure sensor 28A is outside the detection range includes both of a case in which the output of the first pressure sensor 28A assumes a negative value and a case in which the output assumes a maximum value (upper limit). The same goes for the second pressure sensor 28B.

When the determination result in step S103 is "YES" (the output P1 of the first pressure sensor 28A being within the detection range of the first pressure sensor 28A), the processing advances to step S104 in which it is determined whether the output P2 of the second pressure sensor 28B is within the detection range of the second pressure sensor 28B or not.

Figure 4A:
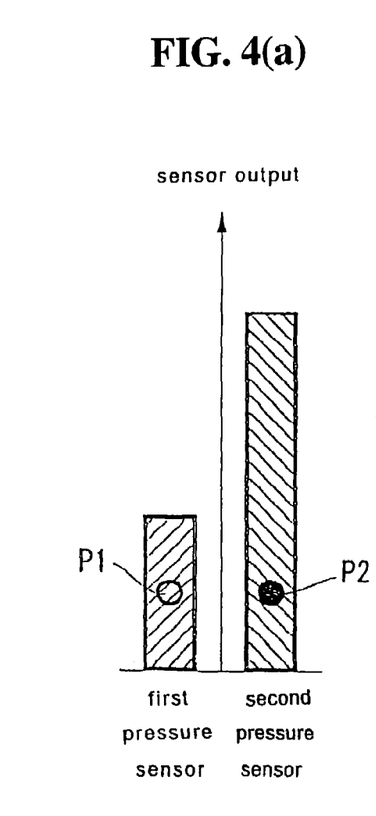
FIG. 4 is a view showing an example of outputs of a first pressure sensor and a second pressure sensor.

When the determination result in step S104 is "YES" (the output P2 of the second pressure sensor 28B being within the detection range of the second pressure sensor 28B), the processing advances to step S105 in which an absolute value of the difference between the output P1 of the first pressure sensor 28A and the output P2 of the second pressure sensor 28B is calculated ($|\Delta P|=|P1-P2|$). FIG. 4(A) shows an example of the outputs of the respective pressure sensors 28A, 28B when the determination result in step S104 is "YES". Here, in FIG. 4(A) to (D), hatched portions indicate the detection ranges of the respective pressure sensors 28A, 28B, wherein a white dot indicates the output P1 of the first pressure sensor 28A and a black dot indicates the output P2 of the second pressure sensor 28B.

Next, the processing advances to step S106 in which it is determined whether the absolute value of the calculated output difference in step S105 is larger than a preset set value p or not.

When the determination result in step S106 is "NO" ($|\Delta P| \leq p$), the processing advances to step S107 in which it is determined that both of the first pressure sensor 28A and the second pressure sensor 28B are normal and the execution of the routine is temporarily finished. That is, since the outputs of both pressure sensors 28A, 28B at the braking input side substantially agree to each other and hence, it is determined that the pressure sensors 28A, 28B are normal.

On the other hand, when the determination result in step S104 is "NO" (the output P2 of the second pressure sensor 28B being outside the detection range of the second pressure sensor 28B), there exists a possibility that the second pressure sensor 28B is in trouble. Further, when the determination result in step S106 is "YES" (|ΔP|>p), there exists a possibility that either one of the first pressure sensor 28A and the second pressure sensor 28B is in trouble and hence, the processing advances to step S108 in which it is determined that the pressure sensor is abnormal and the execution of this routine is temporarily finished.

Furthermore, when the determination result in step S103 is "NO" (the output P1 of the first pressure sensor 28A being outside the detection range of the first pressure sensor 28A), the processing advances to step S109 in which it is determined whether the output P2 of the second pressure sensor 28B is within the detection range of the second pressure sensor 28B or not.

When the determination result in step S109 is "YES" (the output of the second pressure sensor 28B being within the detection range of the second pressure sensor 28B), the processing advances to step S110 in which it is determined whether the output of the second pressure sensor 28B is within the detection range of the first pressure sensor 28A or not.

Figure 4B:
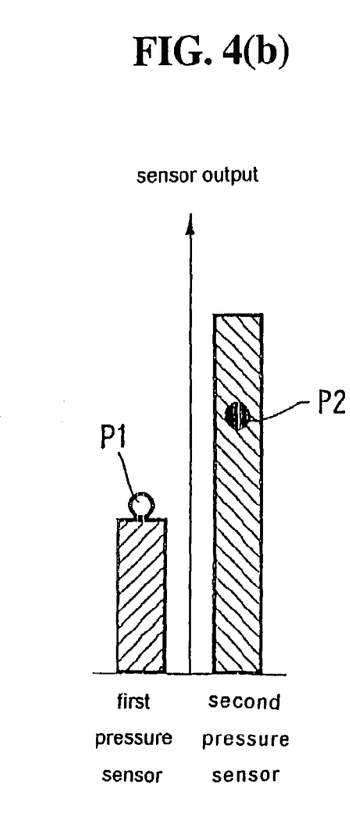

When the determination result in step S110 is "NO" (the output P2 of the second pressure sensor 28B being outside the detection range of the first pressure sensor 28A), the processing advances to step S111 in which a continuation time t of a state that the determination "NO" is made in step S110 is measured. In FIG. 4(B), an example of outputs of the respective pressure sensors 28A, 28B when the determination "NO" is made in step S110 is shown.

Next, the processing advances to step S112 in which the continuation time t measured in step S111 is longer than a preset set time t1 or not (that is, whether the continuation time t exceeds the set time t1 or not). Here, the set time t1 is a standard time which is spent from a point of time that the braking is applied to the vehicle during traveling to a point of time that the vehicle is stopped and is obtained and set based on preliminarily experiments or the like.

When the determination result in step S112 is "NO" (t≦t1), the processing advances to step S113 in which it is determined that the first pressure sensor 28A and the second pressure sensor 28B are normal and the execution of this routine is temporarily finished. That is, in this case, it is considered that the output P1 of the first pressure sensor 28A is temporarily shifted to the outside of the detection range and hence, it is determined that the pressure sensors are normal.

On the other hand, when the determination result in step S112 is "YES" (t>t1), it is usually unthinkable that the vehicle is not stopped within the set time t1 irrespective of the continuation of the state that the braking-input-side liquid pressure is high and hence, there exists a possibility that the second pressure sensor 28B is in trouble whereby the processing advances to step S114 in which it is determined that the second pressure sensor 28B is abnormal and the execution of this routine is temporarily finished.

Figure 4C:
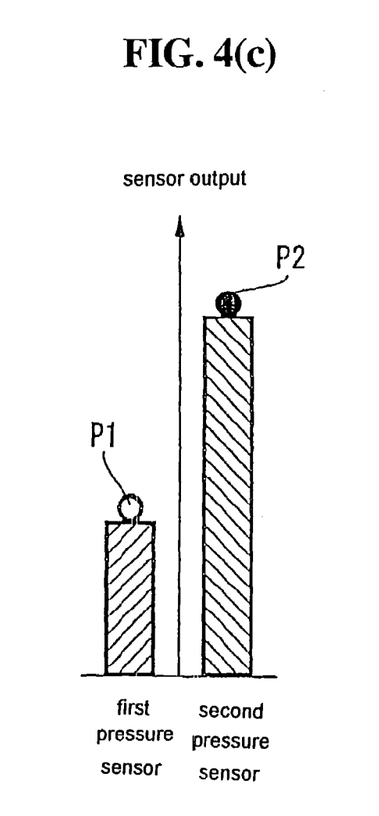
Figure 4D:
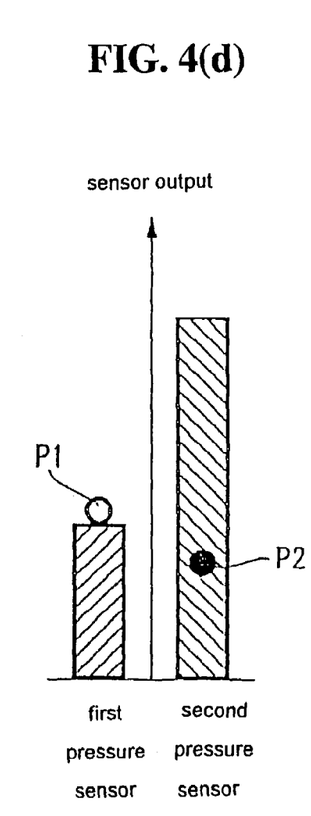

Furthermore, when the determination result in step S109 is "NO" (the output of the second pressure sensor 28B being outside the detection range of the second pressure sensor 28B) or when the determination result in step S110 is "YES" (the output of the second pressure sensor 28B being within the detection range of the first pressure sensor 28A), there exists a possibility that at least one of the first pressure sensor 28A and the second pressure sensor 28B is in trouble and hence, the processing advances to step S114 in which it is determined that the pressure sensor is abnormal and the execution of this routine is temporarily finished. In FIG. 4(C), an example of outputs of the respective pressure sensors 28A, 28B when the determination "NO" is made in step S109 is shown. Further, in FIG. 4(D), an example of outputs of the respective pressure sensors 28A, 28B when the determination "YES" is made in step S110 is shown.

Furthermore, when it is determined that the pressure sensor is abnormal in steps S108, S114, the supply of electricity to all of the first to third electromagnetic open/close valves V1 to V3 is stopped so as to bring the first electromagnetic open/close valve V1 into a normally open state, the second electromagnetic open/close valve V2 into a normally closed state, the third electromagnetic open/close valve V3 into a normally closed state, whereby the brake system is converted from the bi-wire system to a conventional system which directly supplies a liquid pressure generated by the master cylinder 3 to the brake caliper 4.

In this manner, according to the brake device of this embodiment 1, two pressure sensors consisting of the first pressure sensor 28A and the second pressure sensor 28B are provided to the braking input side and the trouble diagnosis processing can be performed by comparing the outputs of these pressure sensors 28A, 28B and hence, even in the state that the braking input side and the braking output side are interrupted from each other, it is possible to perform the trouble diagnosis of the braking-input-side pressure sensors 28A, 28B.

Furthermore, according to this trouble diagnosis processing (trouble diagnosis method), the first pressure sensor 28A and the second pressure sensor 28B have made portions of detection ranges thereof different from each other and hence, it is possible to easily and accurately perform the trouble diagnosis. In addition, in determining that the pressure sensor is in trouble, it is possible to easily focus on which one out of the first pressure sensor 28A and the second pressure sensor 28B has the higher possibility of being in trouble.

Figure 6:
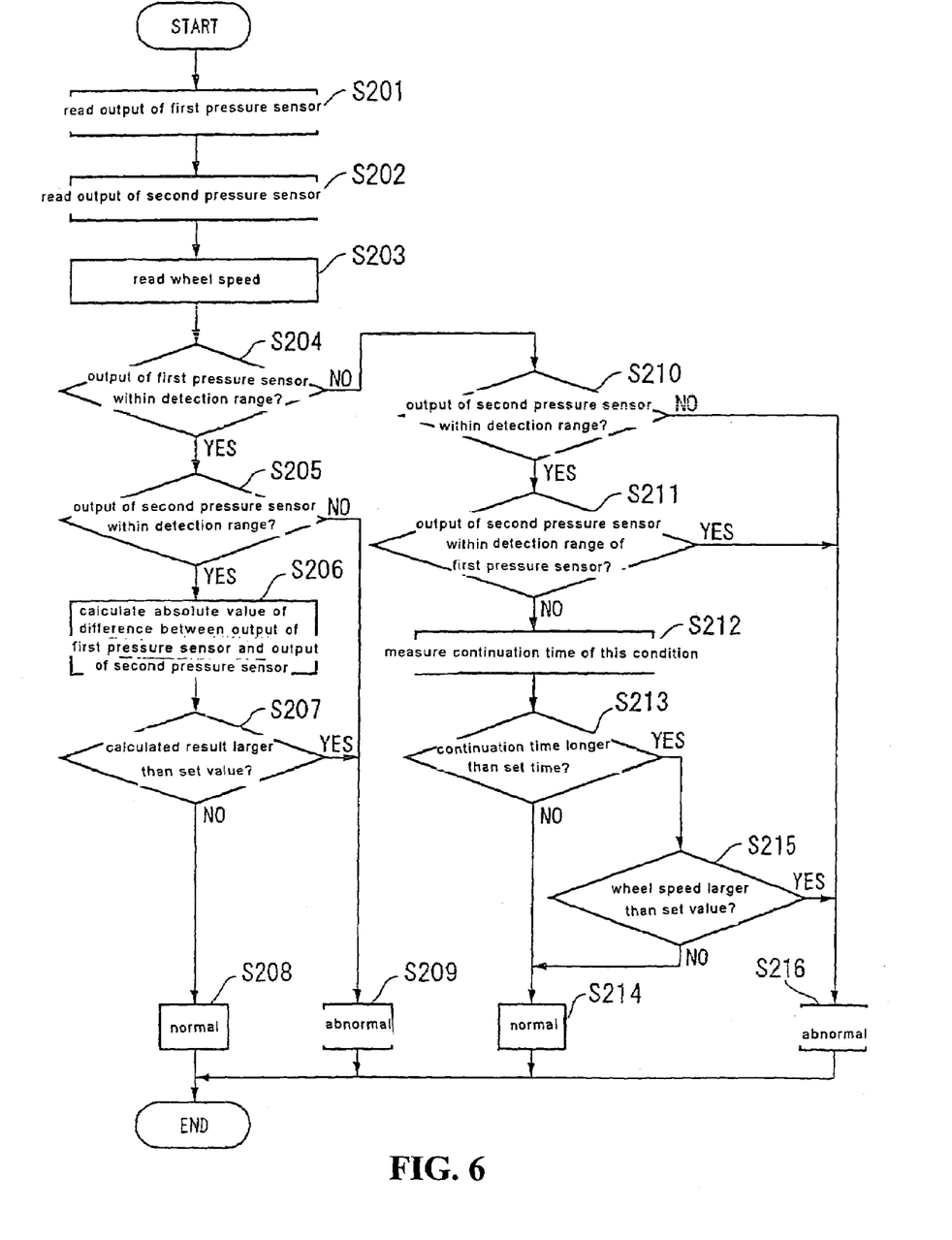
FIG. 6 is a flowchart showing trouble diagnosis processing of a braking-input-side pressure sensor in another embodiment.

Next, the trouble diagnosis processing of the braking-input-side pressure sensors (first pressure sensor 28A, the second pressure sensor 28B) in another embodiment will be explained in accordance with a flow chart shown in FIG. 6. Here, the construction of the hardware of the brake device according to this embodiment is identical with the construction of the hardware of the brake device in the previously-mentioned embodiment. Therefore, an explanation of the construction of the hardware will be omitted by quoting from FIG. 1 to FIG. 3. Furthermore, also with respect to an example of outputs from the first pressure sensor 28A and the second pressure sensor 28B, FIG. 4 is quoted.

The processing in steps S201, S202 is equal to the processing in steps S101, S102 in the embodiment 1 and hence, the explanation of the processing is omitted.

After executing the processing in step S202, the processing advances to step S203 in which an output (wheel speed) V of the wheel speed sensor 31 is read and the processing advances to step S204.

The processing in steps S204 to S209 is equal to the processing in steps S103 to S108 in the above-mentioned embodiment and hence, the explanation of the processing is omitted.

When a determination result in step S204 is "NO" (the output P1 of the first pressure sensor 28A being outside the detection range of the first pressure sensor 28A), the processing advances to step S210. The processing in steps S210 to S214 is equal to the processing in steps S109 to S113 in the above-mentioned embodiment and hence, the explanation of the processing is omitted.

Furthermore, when a determination result in step S213 is "YES" (t>t1), the processing advances to step S215 in which it is determined whether the output V of the wheel speed sensor 31 read in step S203 is larger than a preset set value V0 or not (that is, whether the output V exceeds the set value V0 or not). Here, the set value V0 is set to a vehicle speed which allows the estimation that the vehicle is substantially stopped or is about to stop (for example, several km/hr).

When the determination result in step S215 is "NO" (V≦V0), the sufficient braking is applied to the vehicle although a state that the braking-input-side liquid pressure is high is continued and hence, it is considered that the first pressure sensor 28A and the second pressure sensor 28B are not abnormal whereby the processing advances to step S214 in which it is determined that the pressure sensors are normal and this routine is temporarily finished.

On the other hand, when the determination result in step S215 is "YES" (V>V0), it is usually unthinkable that the vehicle is not lowered to the set vehicle speed V0 or less irrespective of the continuation of the state that the braking-input-side liquid pressure is high and hence, there exists a possibility that the second pressure sensor 28B is in trouble whereby the processing advances to step S216 in which it is determined that the second pressure sensor 28B is abnormal and the execution of this routine is temporarily finished. In this manner, when the vehicle speed exceeds the preset given vehicle speed V0, it is determined that the pressure sensor is in trouble and hence, the accuracy of the trouble diagnosis is enhanced.

Furthermore, when the determination result in step S210 is "NO" (the output of the second pressure sensor 28B being outside the detection range of the second pressure sensor 28B) or when the determination result in step S211 is "YES" (the output of the second pressure sensor 28B being within the detection range of the first pressure sensor 28A), there exists a possibility that at least one of the first pressure sensor 28A and the second pressure sensor 28B is in trouble and hence, the processing advances to step S216 in which the pressure sensor is abnormal and the execution of this routine is temporarily finished.

Furthermore, when it is determined that the pressure sensor is abnormal in steps S209, S216, the supply of electricity to all of the first to third electromagnetic open/close valves V1 to V3 is stopped so as to bring the first electromagnetic open/close valve V1 into a normally open state, the second electromagnetic open/close valve V2 into a normally closed state, and the third electromagnetic open/close valve V3 into a normally closed state, whereby the brake system is converted from the bi-wire system to a conventional system which directly supplies a liquid pressure generated by the master cylinder 3 to the brake caliper 4.

The present invention is not limited to the above-mentioned embodiment.

For example, in the above-mentioned embodiment, although an explanation has been made with respect to the case where the brake device is a motorcycle brake device, the vehicle is not limited to a motorcycle. The brake device may be a brake device of an all terrain vehicle (ATV), which is referred to as buggy, a three-wheeled vehicle, or a four-wheeled vehicle.

In the above-mentioned embodiment, lower limits of detection ranges of the first pressure sensor 28A and the second pressure sensor 28B which differ in the detection range are set equal to each other. However, the lower limit of the detection range of the second pressure sensor 28B may be set larger than the lower limit of the detection range of the first pressure sensor 28A. Furthermore, the present invention is applicable to a case in which the detection ranges of the first pressure sensor 28A and the second pressure sensor 28B are equal.

Furthermore, in the above-mentioned embodiment, the trouble diagnosis is performed based on the absolute value of the difference in output between the first pressure sensor 28A and the second pressure sensor 28B. However, in place of such a method, it is possible to perform the trouble diagnosis such that a ratio (a quotient) of the output of the first pressure sensor 28A and the output of the second pressure sensor 28B is obtained and the trouble diagnosis is performed based on the value of the ratio. That is, the comparison value of the trouble diagnosis may be either the difference or the ratio.

Furthermore, the number of the braking-input-side pressure sensors (pressure detection mechanism) is not limited to two but may be three or more.

In addition, although a bi-wire-type brake device, which includes the ABS and the CBS, is illustrated in the above-mentioned embodiment, the present invention is applicable to a bi-wire-type brake device, which is not provided with either ABS or CBS.

Furthermore, the present invention is also applicable to a brake device in which when the CBS control or the ABS control is not executed, the braking input side and the braking output side are communicated with each other so as to supply the liquid pressure generated at the braking input side to the brake caliper (wheel braking means) thus generating a braking force, and only when the CBS control or the ABS control is executed, the braking input side and the braking output side are interrupted from each other so as to supply the liquid pressure to the brake caliper (wheel braking means) while adjusting the braking-output-side liquid pressure using the hydraulic modulator thus adjusting the braking force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake device for a vehicle, comprising:
 a braking input side which generates a liquid pressure by manipulating a brake manipulation portion of wheels of the vehicle;
 a braking output side which supplies the liquid pressure to a wheel braking mechanism of the wheels, the braking input side and the braking output side being made to be in communication with each other or being interrupted from communication with each other by way of an open/close device;
 a hydraulic modulator which adjusts the liquid pressure of the braking output side by operating an electrically-operated actuator; and
 a plurality of pressure detection mechanisms for detecting the liquid pressure of the braking input side, a first one of the pressure detection mechanisms having a first predetermined detection range, a second one of the pressure detection mechanisms having a second predetermined detection range different from the first predetermined detection range,
 wherein a trouble diagnosis of the pressure detection mechanism is performed in response to detection values of the pressure detection mechanisms, and wherein the second predetermined detection range is larger than the first predetermined detection range, and wherein the trouble diagnosis of the pressure detection mechanisms determines abnormality of the pressure detection mechanisms when the detection value of the first one of the pressure detection mechanisms falls out of the first predetermined detection range and the detection value of the second one of the pressure detection mechanisms falls within the first predetermined detection range.

2. A brake device for a vehicle, comprising:

a braking input side which generates a liquid pressure by manipulating a brake manipulation portion of wheels of the vehicle;

a braking output side which supplies the liquid pressure to a wheel braking mechanism of the wheels, the braking input side and the braking output side being made to be in communication with each other or being interrupted from communication with each other by way of an open/close device;

a hydraulic modulator which adjusts the liquid pressure of the braking output side by operating an electrically-operated actuator; and a plurality of pressure detection mechanisms for detecting the liquid pressure of the braking input side, a first one of the pressure detection mechanisms having a first predetermined detection range, a second one of the pressure detection mechanisms having a second predetermined detection range different from the first predetermined detection range, wherein a trouble diagnosis of the pressure detection mechanism is performed in response to detection values of the pressure detection mechanisms, and wherein the second predetermined detection range is larger than the first predetermined detection range, and when the detection value of the first one of the pressure detection mechanisms falls out of the first predetermined detection range and the detection value of the second one of the pressure detection mechanisms falls out of the first predetermined detection range but within the second predetermined detection range, the trouble diagnosis of the pressure detection mechanism determines abnormality of the pressure detection mechanisms when a continuation time of a state where the detection value of the first one of the pressure detection mechanisms is out of the first predetermined detection range exceeds a set time.

3. A brake device for a vehicle, comprising:

a braking input side which generates a liquid pressure by manipulating a brake manipulation portion of wheels of the vehicle;

a braking output side which supplies the liquid pressure to a wheel braking mechanism of the wheels, the braking input side and the braking output side being made to be in communication with each other or being interrupted from communication with each other by way of an open/close device;

a hydraulic modulator which adjusts the liquid pressure of the braking output side by operating an electrically-operated actuator; and a plurality of pressure detection mechanisms for detecting the liquid pressure of the braking input side, a first one of the pressure detection mechanisms having a first predetermined detection range, a second one of the pressure detection mechanisms having a second predetermined detection range different from the first predetermined detection range, wherein a trouble diagnosis of the pressure detection mechanism is performed in response to detection values of the pressure detection mechanisms, and wherein the second predetermined detection range is larger than the first predetermined detection range, and when the detection value of the first one of the pressure dection mechanisms falls out of the first predetermined detection range and the detection value of the second one of the pressure detection mechanisms falls out of the first predetermined detection range but within the second predetermined detection range, the trouble diagnosis of the pressure detection mechanism determines abnormality of the pressure detection mechanisms when a continuation time of a state where the detection value of the first one of the pressure detection mechanisms falls out of the first predetermined detection range exceeds a set time and a vehicle speed exceeds a set vehicle speed.

4. A brake device for a vehicle, comprising:

a brake pedal;

a master cylinder, said master cylinder being operably connected to said brake pedal to generate a liquid pressure upon operation of said brake pedal;

a brake caliper, said brake caliper being in communication with the master cylinder via at least one braking passage to receive the liquid pressure from the master cylinder;

an electromagnetic open/close valve, said electromagnetic open/close valve being located in the at least one braking passage between the master cylinder and the brake caliper to open and close communication between the master cylinder and the brake caliper;

a hydraulic modulator, said hydraulic modulator adjusting the liquid pressure received by the brake caliper; and a plurality of pressure detection mechanisms for detecting the liquid pressure on a master cylinder side of the electromagnetic open/close valve, a first one of the pressure detection mechanisms having a first predetermined detection range, a second one of the pressure detection mechanisms having a second predetermined detection range different from the first predetermined detection range, wherein a trouble diagnosis of the pressure detection mechanisms is performed in response to detection values of the pressure detection mechanisms, and wherein the second predetermined detection range is larger than the first predetermined detection range, and wherein the trouble diagnosis of the pressure detection mechanisms determines abnormality of the pressure detection mechanisms when the detection value of the first one of the pressure detection mechanisms falls out of the first predetermined detection range and the detection value of the second one of the pressure detection mechanisms falls within the first predetermined detection range.

5. A brake device for a vehicle, comprising:

a brake pedal;

a master cylinder, said master cylinder being operably connected to said brake pedal to generate a liquid pressure upon operation of said brake pedal;

a brake caliper, said brake caliper being in communication with the master cylinder via at least one braking passage to receive the liquid pressure from the master cylinder;

an electromagnetic open/close valve, said electromagnetic open/close valve being located in the at least one braking passage between the master cylinder and the brake caliper to open and close communication between the master cylinder and the brake caliper;

a hydraulic modulator, said hydraulic modulator adjusting the liquid pressure received by the brake caliper; and a plurality of pressure detection mechanisms for detecting the liquid pressure on a master cylinder side of the electromagnetic open/close valve, a first one of the pressure detection mechanisms having a first predetermined detection range, a second one of the pressure detection mechanisms having a second predetermined detection range different from the first predetermined detection range, wherein a trouble diagnosis of the pressure detection mechanisms is performed in response to detection values of the pressure detection mechanisms, and wherein the second predetermined detection range is larger than the first predetermined detection range, and when the detection value of the first one of the pressure detection mechanisms falls out of the first predetermined detection range and the detection value of the second one of the pressure detection mechanisms falls out of the first predetermined detection range but within the second predetermined detection range, the trouble diagnosis of the pressure detection mechanism determines abnormality of the pressure detection mechanisms when a continuation time of a state where the detection value of the first one of the pressure detection mechanisms is out of the first predetermined detection range exceeds a set time.

6. A brake device for a vehicle, comprising:

a brake pedal;

a master cylinder, said master cylinder being operably connected to said brake pedal to generate a liquid pressure upon operation of said brake pedal;

a brake caliper, said brake caliper being in communication with the master cylinder via at least one braking passage to receive the liquid pressure from the master cylinder;

an electromagnetic open/close valve, said electromagnetic open/close valve being located in the at least one braking passage between the master cylinder and the brake caliper to open and close communication between the master cylinder and the brake caliper;

a hydraulic modulator, said hydraulic modulator adjusting the liquid pressure received by the brake caliper; and a plurality of pressure detection mechanisms for detecting the liquid pressure on a master cylinder side of the electromagnetic open/close valve, a first one of the pressure detection mechanisms having a first predetermined detection range, a second one of the pressure detection mechanisms having a second predetermined detection range different from the first predetermined detection range, wherein a trouble diagnosis of the pressure detection mechanisms is performed in response to detection values of the pressure detection mechanisms, and wherein the second predetermined detection range is larger than the first predetermined detection range, and when the detection value of the first one of the pressure detection mechanisms falls out of the first predetermined detection range and the detection value of the second one of the pressure detection mechanisms falls out of the first predetermined detection range but within the second predetermined detection range, the trouble diagnosis of the pressure detection mechanism determines abnormality of the pressure detection mechanisms when a continuation time of a state where the detection value of the first one of the pressure detection mechanisms falls out of the first predetermined detection range exceeds a set time and a vehicle speed exceeds a set vehicle speed.

* * * * *